United States Patent [19]
Runyan

[11] Patent Number: 5,181,647
[45] Date of Patent: Jan. 26, 1993

[54] METHOD AND TOOLING FOR FABRICATING MONOLITHIC METAL OR METAL MATRIX COMPOSITE STRUCTURES

[75] Inventor: Max R. Runyan, Huntington Beach, Calif.

[73] Assignee: McDonnell Douglas Corporation, Long Beach, Calif.

[21] Appl. No.: 788,918

[22] Filed: Nov. 7, 1991

Related U.S. Application Data

[62] Division of Ser. No. 627,335, Dec. 14, 1990, Pat. No. 5,098,011.

[51] Int. Cl.⁵ .................. B23K 37/04; B23P 19/04
[52] U.S. Cl. .................. 228/44.3; 269/22; 29/238
[58] Field of Search .......... 228/5.5, 44.3, 243; 29/238; 269/22

[56] References Cited

U.S. PATENT DOCUMENTS

| | | | |
|---|---|---|---|
| 3,168,782 | 2/1965 | Cochran | 228/44.3 |
| 3,700,226 | 10/1972 | Mrugala | 269/22 |
| 3,736,638 | 6/1973 | Stone, Jr. | 228/233 |
| 4,087,037 | 5/1978 | Schier et al. | 228/44.3 |

Primary Examiner—Richard K. Seidel
Assistant Examiner—Jeffrey T. Knapp
Attorney, Agent, or Firm—Gregory A. Cone; John P. Scholl

[57] ABSTRACT

The tool and the process for forming structural shapes from multiple elements of either a monolithic or metal matrix composition by either diffusion bonding or brazing the metal or metal composites under temperature and pressure. The pressure is applied by expanding superplastic metal bladders, the specimen is contained in a superplastic metal vacuum bag, and all are contained in a steel die cavity.

6 Claims, 3 Drawing Sheets

METHOD AND TOOLING FOR FABRICATING MONOLITHIC METAL OR METAL MATRIX COMPOSITE STRUCTURES

CROSS-REFERENCED APPLICATIONS

The present application is a divisional application of prior application Ser. No. 07/627,335, filed Dec. 14, 1990, now U.S. Pat. No. 5,098,011.

BACKGROUND OF THE INVENTION

This invention relates to the field of diffusion bondable structures, superplastic forming techniques, and more particularly to structures made from monolithic metal or metal matrix composite materials.

Performance requirement goals for the National Aerospace Plane (NASP), which is a manned hypersonic transport vehicle, require airframe structures and engine materials that exceed the capabilities of commercially available materials and manufacturing technologies. However, for some time experimental work has been underway with metal-matrix composites which are similar to the well known polymeric composites except that the matrix is a metal rather than a polymer in an effort to produce higher temperature and lower weight space structures. Metal-matrix composites are fabricated by placing a reinforcing material such as silicon carbide fibers between foils of a matrix material such as a metal alloy. These ingredients are then consolidated into a composite by pressing them together at high temperatures and pressures which cause the matrix to flow around the reinforcing fibers and diffusion bond the matrix together to form a unique composite. Different alloys of aluminum, magnesium, and titanium have been used as the matrix materials and as the reinforcing phase fibers, powders, and whiskers made from silicon carbide, alumina, graphite, boron and other materials have been used. The actual material used to prove the process and tools discussed herein was titanium 15-3-3-3 with reinforcing fibers of silicon carbide. However the process was developed first using monolithic titanium alloy 15-3-3-3.

The elements, when using the monolithic titanium, may be formed superplastically or by any other conventional method. FIG. 4 shows a section through a typical large airplane wing spar with the flanges canted with respect to the web. These spars are currently machined on a spar mill and due to long spar length, amount of material to be removed, and post heat treatment are very expensive to fabricate.

Although several different methods for fabricating the metal matrix composite elements have been used, the most successful current procedure uses a hot isostatic press (HIP). These chambers achieve diffusion bonding temperatures while applying pressures upwards of 15,000 PSI. Obviously, these chambers are not only in short supply but their use is expensive. Either sheet material or simple structural sections like channel sections can be produced in the HIP chamber. In order to obtain a sound composite element with optimum mechanical properties it is necessary to consolidate the matrix with the reinforcement phase by applying extreme pressures to avoid poor interfacial bonding between the graphite and the metal matrix. It is well known in the diffusion bonding art that the bond improves substantially with increased pressure, up to a point.

Simple sections, like the channel sections, are formed in the HIP chamber just as the sheet stock is by applying alternate layers of metal foil and reinforcing fibers or cloth. In the case of the simple sections they are formed in the shape of the section rather than a flat sheet. In order to form more complex shapes, at least by the present known art, you would have to combine preformed simple shapes in order to form the complex shapes so that the result is that it is at least a two step operation in the HIP chamber. Further, in the HIP chamber, in order to maintain an inert environment around the specimen to avoid oxidizing, it is necessary to maintain the specimen in a bag and there is no simple way to monitor leaks in the bag so that if a leak develops in the bag the whole shot is lost.

It is an object of the present invention to provide a method and tools to fabricate complex structural shapes made from either metal matrix composite or monolithic metal elements e.g. I-beams, tapered I-beams, I-beams with a sinusoidal shaped web section, and conventional cross-section beams e.g. T, X, Y, H, L and Z sections used in aircraft structures.

It is a further object of this invention to provide the above-noted complex structural shapes, in the case of the metal composites, using the HIP chamber only in the initial phase. This phase includes consolidating the materials into the composite elements which may include the formation of simple shapes, which, in this invention, are combined to make the complex shapes.

Yet a further object of this invention is to produce complex structures from both diffusion bondable monolithic metal or metal matrix composites and non-fusion bondable monolithic metal or metal matrix composites by the introduction of suitable brazing foil between the elements.

As a final object of this invention, it is intended to provide a process which can be monitored so that the metal vacuum bag surrounding the specimen at the time of formation and the pressurizing bladders may be monitored for leaks; in the event a leak occurs, the process may be stopped and the leak corrected without losing the specimen.

SUMMARY OF THE INVENTION

Briefly, and in general terms, the present invention provides the method and tooling for fabricating monolithic metal or metal matrix composite structures. Generally, the structural sections are formed, in the case of the metal composites, by bonding, under pressure, multiple elements previously formed by a more expensive process. In the monolithic metal case the elements are formed by cheaper, conventional methods. The elements to be bonded are enveloped in a metal vacuum bag so as to insure a contaminant free environment. The bonding is accomplished at diffusion bonding temperatures or brazing alloy melting points, depending on the metal used in either the metal matrix or monolithic metal and the pressure is applied by expanding a metal bladder. All of the surfaces not acted upon by the expanding metal bladder are rigidly supported with an essentially net tolerance so as to control the dimensions of the structural element being formed. The surfaces acted upon by the expanding bladder are also positively supported to the degree required to make certain that the particular surface cannot float with respect to the other surfaces but the support means must be such that the expanded metal bladder will envelop the support so as to apply force against the surfaces of the element being joined or bonded to form the structural member.

The process consists, essentially, of arranging the monolithic metal or metal matrix composite elements so as to form the desired structural section, all inside a metal vacuum bag. The arranged elements inside the metal vacuum bag are then positively supported on all surfaces not acted upon by the expanding metal bladders which is normally done by spacers bearing against a rigid fixture. The bladders to be expanded are located so as to properly bear against the surfaces to be bonded while enveloping the means used to positively support the bonded surface. The apparatus including the specimen is heated to the diffusion bonding temperature or the melting temperature of the brazing foil, as the case may be, which must also be the temperature at which the vacuum bag exhibits sufficient ductility so as to not interfere with the bladder function. The vacuum bag is then evacuated and purged with an inert gas and finally evacuated while the apparatus, including the specimen is raised to its bonding temperature and the metal bladders are expanded so as to provide the necessary force to form a suitable bond between the elements of the structure.

BRIEF DESCRIPTION OF THE DRAWINGS

With reference to the drawings wherein like numbers designate like portions of the invention.

BEST MODE FOR CARRYING OUT THE INVENTION

Figures 1, 2, 2A:
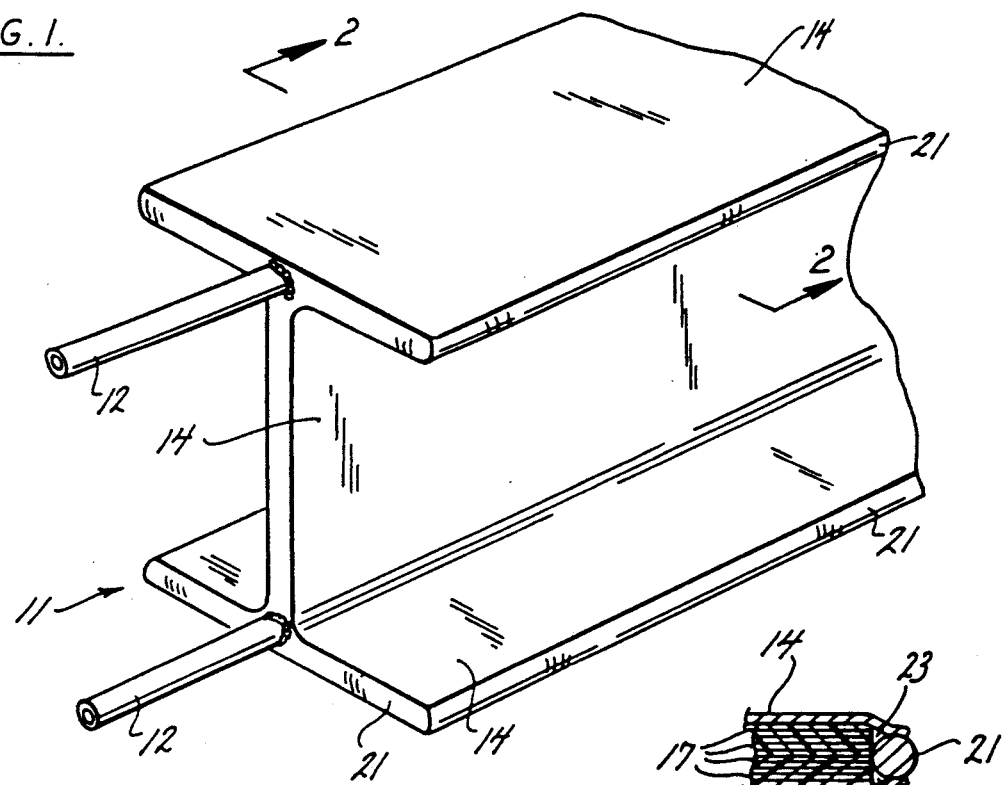
FIG. 1 shows an I-beam in a protective metal vacuum bag with purge/vacuum lines welded to the bag.
FIG. 2 is a section view through FIG. 1 showing the elements to be joined and the vacuum bag formation.
FIG. 2a is an enlarged section view of a portion of the section of FIG. 2 which shows the elements composed of multiple layers of laminate.
Figure 3:
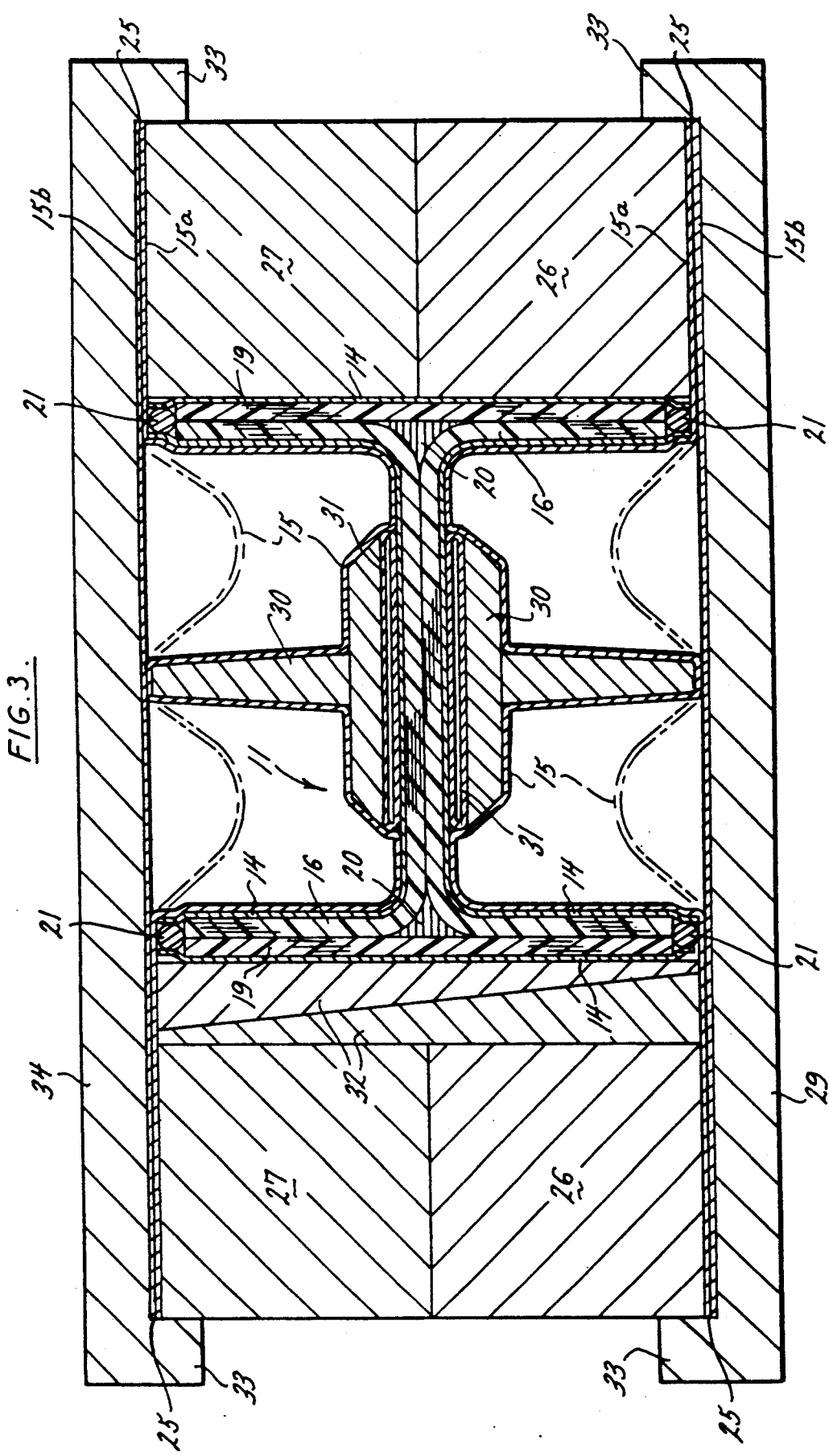
FIG. 3 is a section through the specimen being formed showing the tool, including the bladders to pressurize the surfaces being joined, and means to retain the other surfaces.

FIG. 3 is a section view through the specimen, which happens to be an I-beam, and the supporting tooling, also including the metal vacuum bag 14 and the metal bladders 15. FIG. 1 is an isometric view of the vacuum bag 14 surrounding the specimen and also showing the purge/vacuum lines 12. Identified as 11 is the combined vacuum bag 14 and the specimen, also shown in section in FIG. 2. The specimen, as shown, is an I-beam which may well be tapered along its length, and is made up from two channel sections 16 previously made in a HIP chamber as discussed in the Background of the Invention. The channel sections are normally made from multiple layers or laminates 17 of the metal matrix composite material as shown in the enlarged view of FIG. 2a, or from monolithic metal elements. The upper and lower surfaces of the I-beam are shown as 19 and may also be made from laminates of the same metal matrix composite materials, although they could be a single laminate depending on the thickness of the flange desired on the I-beam. Shown in this specimen between the top and bottom flange surfaces 19 and the channel sections 16 is a lacuna 20, which is optional, and serves to fill the cavity at this particular joint. The lacuna, in this case, was machined from titanium as the channel sections were fabricated from titanium matrix composites or monolithic titanium, all of which are diffusion bondable.

Figure 6:
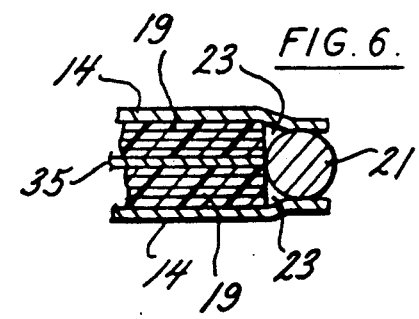
FIG. 6 is an enlarged view of an alternate embodiment of FIGS. 2/2a wherein the metal matrix or monolithic metal elements being joined are not diffusion bondable and require the insertion of a foil layer of brazing material.

The vacuum bag 14 is best shown in FIGS. 1 and 2 and surrounds the structural specimen being formed. The bag shown was made from titanium 6-4 which has superplastic properties. However, all that is required is a metal bag which is ductile at the bonding temperature. The envelope is closed at the ends with titanium weld wire 21 which is fusion welded to close the bag. Note the opening 23 in FIGS. 2a and 6 next to the weld wire 21 which provides a gas passage. Purge/vacuum lines 12 are fusion welded in place and are used to vacuum purge, inert gas purge, and finally evacuate to maintain the specimen in a contaminant free atmosphere. The purge/vacuum lines 12 are monitored during the entire process of forming the structural member and in the event that the vacuum bag cracks the process is stopped to avoid total loss of the specimen.

You now have a specimen enveloped in a generally conforming metal vacuum bag, the combination identified herein as 11. If the metal vacuum bag is diffusion bondable to the specimen the inside of the vacuum bag must be coated with stop-off to prevent bonding between the bag and the specimen. The stop-off may out gas and contaminate the atmosphere in the bag. A suitable alternative is to avoid the stop-off and remove the vacuum bag by a chemical milling process. Metal bladders 15 are then formed to fit between the specimen and the fixture. At least the portions of the bladder to be expanded must be made from metals having superplastic characteristics such as titanium. The half of the bladder identified as 15a is the only portion of the bladder expanding against the specimen shown in FIG. 3 and requires superplastic characteristics. The two halves of the bladder 15a and 15b are joined around the perimeter with any gas tight weld 25.

A bladder 15 is placed in the bottom one-half of the containment fixture 29 and the support spacers 26 and 27 are stacked at one end and the specimen, including the vacuum bag, is placed against the spacers 26 and 27. The spacers 26 and 27 are split to ease the removal of the formed specimen after the bladders are expanded. A specially shaped spacer, herein, a T-spacer 30 is placed between the expandable bladder 15 and the metal vacuum bag located adjacent the web portion of the I-beam specimen being formed. In this particular embodiment a second bladder 31 is placed between the flat portion of the T and the vacuum bag in the web section of the specimen. Identical elements are placed above the web section of the specimen so as to form a symmetrical arrangement i.e. a second bladder 31 followed by a T-spacer 30. A pair of wedge shaped spacers 32 are placed against the vacuum bag 14 in the area of the flange of the specimen followed by support spacers 26 and 27 which must, again, provide positive support for the specimen with an essentially net tolerance. Another bladder 15 is placed on the top of the spacers and specimen followed by the top one-half of the support fixture 34. (The partially expanded bladder 15 is shown in broken lines and fully expanded in solid lines.)

The T-spacers 30 are designed so that when the bladders 15 are expanded they envelop the T-spacers and bear against the surface of the T-spacer which in turn bears against the second bladder 31 so as to put pressure against both of the two portions of the channel sections which join to form the web and also bears against the flanges. As shown in the fully expanded position, the bladder 15 occupies the entire space, other than that occupied by the second bladder 31 and the T-spacer. The second metal bladder 31 when pressurized bears against the web portion only of the specimen to be joined. Of course, pressurizing means in the form of tubes must be attached to the second bladders 31 so that they may be pressurized from the outside of the fixture the same as the bladder 15. The pressures used in this process are in the range of 250 psi.

The fixture and assembly shown in FIG. 3 is designed for placement in a heated platen press similar to the presses used for superplastic forming. The press holds the two halves of the fixture 29 and 34 while the support spacers 26, 27 and 32 support the specimen in the direction 90 degrees to the top and bottom of the fixture which are, in turn, restrained by the lip 33.

It should now be reasonably understood that by pressurizing the bladders 15 and 31 to approximately 250 PSI after heating the specimen to the proper superplastic temperature the elements of the specimen will diffusion bond to form a complete I-beam. It is important, again, to note that essentially zero tolerance, absolute positive support must be provided in all directions in order to control the specimen. Although it may be possible to form the specimen with a single T-spacer 30 and controlling the differential pressure between the two bladders 15; however, it is preferred to put positive spacers on both sides of the web or the web may float and destroy the specimen. Also bladder 31 is not absolutely essential but improves the quality of the final structure.

While the specimen shown is made from materials that diffusion bond at the proper elevated temperature it is possible to use non-diffusion bonding materials. In the latter case a foil of brazing material must be placed between each of the surfaces to be joined such as the foils shown at 35 in FIG. 6 and the same foil would have to be placed between the two engaging portions of the channel sections 16 so as to form a proper bond. The term fusion temperature as used herein is intended to mean the fusion temperature where the materials are diffusion bondable or brazing foil melting temperature where brazeable materials are used. Also metal, bondable elements are intended to include elements made from either monolithic metal or metal matrix composites. The term monolithic metal simply means a metal alloy without fibrous reinforcement.

Figure 4:
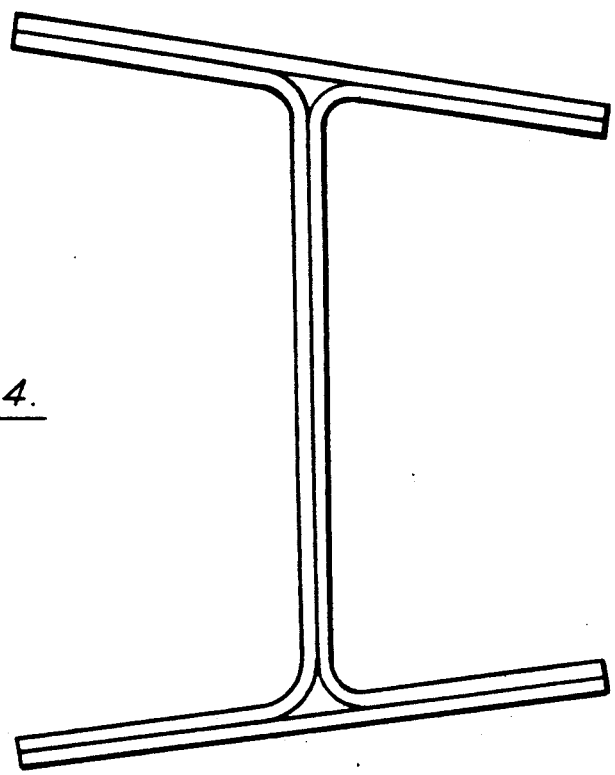
FIG. 4 is a section through a representative aircraft wing spar made from monolithic metal elements.

FIGS. 4 shows an aircraft wing spar section with canted flanges with respect to the web to form a special I-beam made from either monolithic metal elements or metal matrix composites. This process is also capable of providing lightning holes with a stiffened edge, e.g. in the web of the I-beam.

Figure 5:
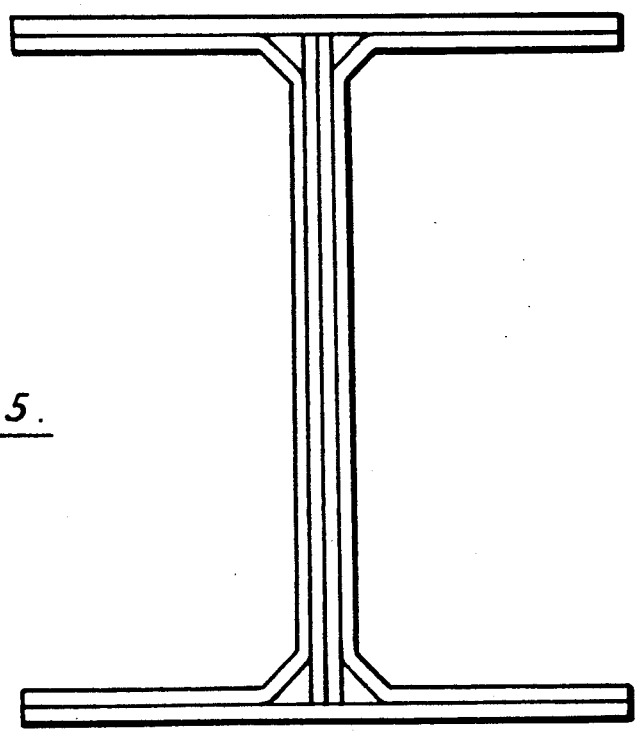
FIG. 5 is an alternate assembly of elements to make an I-beam.

FIG. 5 shows alternate elements to form an I-beam structural section. Also, common structural sections such as T, X, Y, Z, J, and L sections can be similarly formed provided positive support is provided against all surfaces of the structural member not acted upon by the metal bladder. In some of these structural sections the joined portions require a specially designed support means which allows the expanding and pressurizing bladder to envelop the support so as to properly pressurize the surfaces to be bonded which is a substitute for the T-spacer 30 in FIG. 3.

It should now be reasonably clear as to how to form and structurally support and tool for the formation of structural sections from metal matrix composite elements without the use of the HIP chamber in the second phase or alternately from monolithic metal elements formed by conventional methods, while easily accommodating the monitoring of the vacuum bag during the process.

What is claimed is:

1. A tool for forming a structural member from at least two metal bondable elements and wherein bonding pressure for at least one bonding surface is supplied by at least one metal bladder, comprising:
   first support means to positively support with an essentially zero tolerance, all surfaces of said structural member not acted upon by said at least one metal bladder;
   second means to positively support, with an essentially zero tolerance, at least one of said surfaces of said structural member contacting said at least one metal bladder so that said expanded metal bladder may envelope said second means and apply force against said surface of said structural member; and
   means to accommodate gas tubes for pressurizing said metal bladders.

2. The tool as set out in claim 1 wherein said first support means comprises a series of spacers conformed to match the engaging surfaces of said structural member so as to positively support, with an essentially zero tolerance, said structural member and containment of said series of spacers in a containment fixture.

3. The tool as set out in claim 1 wherein said second support means comprises a support having a minimum area bearing against said at least one metal bladder allowing said bladder to expand around said support while providing positive support with an essentially zero tolerance.

4. The tool as set out in claim 1 wherein said at least one metal bladder is two metal bladders arranged so as to engage opposite sides of said surfaces to be bonded to said structural member.

5. The tool as set out in claim 1 further comprising at least one second metal bladder located between said second support means and said at least one of said bonding surfaces of said structural member.

6. The tool as set out in claim 2 wherein said containment fixture has an upper and a lower half with space between said halves and said halves having a lip to restrain said spacers so as to react to loads acting in a plane parallel to the plane of said upper and lower halves of said fixture.

* * * * *